United States Patent
Han et al.

(10) Patent No.: US 9,414,306 B2
(45) Date of Patent: Aug. 9, 2016

(54) DEVICE-TO-DEVICE (D2D) PREAMBLE DESIGN

(71) Applicant: Intel IP Corporation, Santa Clara, CA (US)

(72) Inventors: Seunghee Han, Anyangshi (KR); Alexey Vladimirovich Khoryaev, Dzerzhinsk (RU); Debdeep Chatterjee, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 125 days.

(21) Appl. No.: 14/140,823

(22) Filed: Dec. 26, 2013

(65) Prior Publication Data

US 2014/0321360 A1    Oct. 30, 2014

Related U.S. Application Data

(60) Provisional application No. 61/806,821, filed on Mar. 29, 2013, provisional application No. 61/816,662, filed on Apr. 26, 2013.

(51) Int. Cl.
*H04W 80/04* (2009.01)
*H04W 88/06* (2009.01)
(Continued)

(52) U.S. Cl.
CPC ........... *H04W 48/18* (2013.01); *H04J 11/0023* (2013.01); *H04L 5/0032* (2013.01); *H04L 65/1006* (2013.01); *H04L 65/1016* (2013.01); *H04L 65/1069* (2013.01); *H04L 65/1073* (2013.01); *H04L 65/602* (2013.01);
(Continued)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

| | | |
|---|---|---|
| 5,331,413 A | 7/1994 | Diner |
| 5,617,422 A | 4/1997 | Litzenberger et al. |

(Continued)

FOREIGN PATENT DOCUMENTS

| | | | | |
|---|---|---|---|---|
| CN | EP2849494 | * | 3/2015 | ............ H04W 40/24 |
| KR | 20080067273 A | | 7/2008 | |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.4.0, (Sep. 2013), 182.

(Continued)

*Primary Examiner* — Ronald B Abelson
(74) *Attorney, Agent, or Firm* — Schwegman Lundberg & Woessner, P.A.

(57) ABSTRACT

This application discusses, among other things, methods and apparatus for providing more efficient ways to enable D2D discovery and D2D communication simultaneously. In an example, a method can include assembling device-to device (D2D) discovery data at a wireless device, assembling D2D communication data at the wireless device, assembling a D2D preamble including the discovery data and the communication data, and transmitting the D2D preamble using a wireless transmitter of the wireless device.

19 Claims, 13 Drawing Sheets

(51) Int. Cl.

| | | |
|---|---|---|
| *H04W 28/04* | (2009.01) | |
| *H04W 72/04* | (2009.01) | |
| *H04W 48/18* | (2009.01) | |
| *H04N 7/14* | (2006.01) | |
| *H04W 28/02* | (2009.01) | |
| *H04W 52/02* | (2009.01) | |
| *H04W 76/04* | (2009.01) | |
| *H04W 8/00* | (2009.01) | |
| *H04L 5/00* | (2006.01) | |
| *H04W 88/02* | (2009.01) | |
| *H04W 36/00* | (2009.01) | |
| *H04W 60/00* | (2009.01) | |
| *H04L 29/06* | (2006.01) | |
| *H04W 8/22* | (2009.01) | |
| *H04J 11/00* | (2006.01) | |
| *H04W 24/06* | (2009.01) | |
| *H04W 72/12* | (2009.01) | |
| *H04L 12/801* | (2013.01) | |
| *H04W 76/06* | (2009.01) | |
| *H04W 48/06* | (2009.01) | |
| *H04W 76/02* | (2009.01) | |

(52) U.S. Cl.
CPC ............ *H04L65/608* (2013.01); *H04L 65/80* (2013.01); *H04N 7/141* (2013.01); *H04N 7/147* (2013.01); *H04W 8/005* (2013.01); *H04W 8/22* (2013.01); *H04W 24/06* (2013.01); *H04W 28/0289* (2013.01); *H04W 36/0066* (2013.01); *H04W 52/0212* (2013.01); *H04W 60/00* (2013.01); *H04W 72/0486* (2013.01); *H04W 72/1231* (2013.01); *H04W 76/023* (2013.01); *H04W 76/048* (2013.01); *H04W 88/02* (2013.01); *H04L 47/10* (2013.01); *H04W 48/06* (2013.01); *H04W 76/027* (2013.01); *H04W 76/068* (2013.01); *H04W 88/06* (2013.01); *Y02B 60/50* (2013.01)

(56) References Cited

U.S. PATENT DOCUMENTS

| | | | |
|---|---|---|---|
| 5,686,957 | A | 11/1997 | Baker |
| 6,104,721 | A | 8/2000 | Hsu |
| 7,724,972 | B2 | 5/2010 | Wang et al. |
| 8,019,175 | B2 | 9/2011 | Lee et al. |
| 8,358,613 | B1 * | 1/2013 | Giallorenzi et al. .......... 370/328 |
| 8,570,359 | B2 | 10/2013 | Ali et al. |
| 8,711,198 | B2 | 4/2014 | Malzbender et al. |
| 8,830,892 | B2 | 9/2014 | Chung et al. |
| 8,922,718 | B2 | 12/2014 | House et al. |
| 8,970,653 | B2 | 3/2015 | Bowen et al. |
| 8,977,063 | B2 | 3/2015 | Lee et al. |
| 2004/0192211 | A1 | 9/2004 | Gallagher et al. |
| 2005/0202823 | A1 | 9/2005 | Shaheen et al. |
| 2008/0096566 | A1 | 4/2008 | Brunner et al. |
| 2009/0040955 | A1 | 2/2009 | Jung et al. |
| 2009/0147685 | A1 | 6/2009 | Malhotra et al. |
| 2009/0210766 | A1 | 8/2009 | Katayama et al. |
| 2009/0280802 | A1 | 11/2009 | Chin et al. |
| 2010/0026781 | A1 | 2/2010 | Ali et al. |
| 2010/0067433 | A1 | 3/2010 | Cheng et al. |
| 2010/0074182 | A1 | 3/2010 | Shao |
| 2010/0081391 | A1 | 4/2010 | Suzuki et al. |
| 2010/0118111 | A1 | 5/2010 | Bouazizi |
| 2010/0130237 | A1 | 5/2010 | Kitazoe et al. |
| 2010/0202561 | A1 | 8/2010 | Gorokhov et al. |
| 2010/0208607 | A1 | 8/2010 | Chin et al. |
| 2010/0220652 | A1 | 9/2010 | Ishii et al. |
| 2010/0238805 | A1 | 9/2010 | Ludwig et al. |
| 2010/0317394 | A1 | 12/2010 | Harris et al. |
| 2011/0019633 | A1 | 1/2011 | Tajima et al. |
| 2011/0161441 | A1 | 6/2011 | Haruna et al. |
| 2011/0195710 | A1 | 8/2011 | Nas et al. |
| 2011/0217980 | A1 | 9/2011 | Faurie et al. |
| 2011/0217985 | A1 | 9/2011 | Gorokhov |
| 2011/0235706 | A1 | 9/2011 | Demircin et al. |
| 2011/0242975 | A1 | 10/2011 | Zhao et al. |
| 2011/0250888 | A1 | 10/2011 | Ryu et al. |
| 2011/0258313 | A1 | 10/2011 | Mallik et al. |
| 2011/0263255 | A1 | 10/2011 | Alonso-rubio et al. |
| 2012/0008574 | A1 | 1/2012 | Xiao et al. |
| 2012/0087396 | A1 | 4/2012 | Nimbalker et al. |
| 2012/0176884 | A1 | 7/2012 | Zhang et al. |
| 2012/0281621 | A1 | 11/2012 | Lotfallah et al. |
| 2012/0287881 | A1 | 11/2012 | Arnott et al. |
| 2012/0307794 | A1 | 12/2012 | Shaheen et al. |
| 2012/0320141 | A1 | 12/2012 | Bowen et al. |
| 2013/0039180 | A1 | 2/2013 | Hong et al. |
| 2013/0039339 | A1 | 2/2013 | Rayavarapu et al. |
| 2013/0040671 | A1 | 2/2013 | Zawaideh et al. |
| 2013/0044697 | A1 | 2/2013 | Yoo et al. |
| 2013/0045707 | A1 | 2/2013 | Lee et al. |
| 2013/0051277 | A1 | 2/2013 | Hakola et al. |
| 2013/0101036 | A1 | 4/2013 | Zhou |
| 2013/0170415 | A1 | 7/2013 | Fukuta et al. |
| 2013/0170479 | A1 * | 7/2013 | Fong ................. H04W 72/0446 370/336 |
| 2013/0195074 | A1 | 8/2013 | Keller et al. |
| 2013/0258919 | A1 | 10/2013 | Damnjanovic |
| 2013/0301501 | A1 | 11/2013 | Olvera-Hernandez et al. |
| 2014/0176663 | A1 | 6/2014 | Cutler et al. |
| 2014/0219088 | A1 | 8/2014 | Oyman et al. |
| 2014/0225918 | A1 | 8/2014 | Mittal et al. |
| 2014/0286215 | A1 | 9/2014 | Koc et al. |
| 2014/0295864 | A1 | 10/2014 | Gunnarsson et al. |
| 2014/0320587 | A1 | 10/2014 | Oyman |
| 2014/0321272 | A1 | 10/2014 | Bangolae et al. |
| 2014/0321343 | A1 | 10/2014 | Gupta et al. |
| 2014/0321369 | A1 | 10/2014 | Davydov et al. |
| 2014/0323128 | A1 | 10/2014 | Zaus et al. |
| 2014/0323133 | A1 | 10/2014 | Yeh et al. |
| 2014/0325078 | A1 | 10/2014 | Shan et al. |
| 2015/0195490 | A1 | 7/2015 | Oyman et al. |

FOREIGN PATENT DOCUMENTS

| | | |
|---|---|---|
| KR | 1020090006281 A | 1/2009 |
| KR | 20100054015 A | 5/2010 |
| KR | 1020110051787 A | 5/2011 |
| KR | 1020110102935 A | 9/2011 |
| KR | 1020120099805 A | 9/2012 |
| TW | 201446026 A | 12/2014 |
| TW | 201501498 A | 1/2015 |
| TW | 201507374 A | 2/2015 |
| WO | WO-2007053851 A2 | 5/2007 |
| WO | WO-2012065658 A1 | 5/2012 |
| WO | WO-2013025040 A2 | 2/2013 |
| WO | WO-2014160765 A1 | 10/2014 |
| WO | WO-2014176058 A1 | 10/2014 |
| WO | WO-2014176087 A1 | 10/2014 |
| WO | WO-2014176089 A1 | 10/2014 |
| WO | WO-2014176106 A1 | 10/2014 |
| WO | WO-2014176200 A1 | 10/2014 |
| WO | WO-2014176245 A1 | 10/2014 |
| WO | WO-2014176480 A1 | 10/2014 |

OTHER PUBLICATIONS

"U.S. Appl. No. 14/107,400, Non Final Office Action mailed May 27, 2015", 21 pgs.

"U.S. Appl. No. 14/109,121, Non Final Office Action mailed Apr. 29, 2015", 6 pgs.

"U.S. Appl. No. 14/109,121, Non Final Office Action mailed Aug. 14, 2015", 8 pgs.

"U.S. Appl. No. 14/109,121, Response filed Jul. 28, 2015 to Non Final Office Action mailed Apr. 29, 2015", 10 pgs.

"U.S. Appl. No. 14/132,525, Examiner Interview Summary mailed May 28, 2015", 3 pgs.

"U.S. Appl. No. 14/132,525, Non Final Office Action mailed May 7, 2015", 15 pgs.

(56) References Cited

OTHER PUBLICATIONS

"U.S. Appl. No. 14/132,525, Response filed Aug. 7, 2015 to Non Final Office Action mailed May 7, 2015", 14 pgs.
"U.S. Appl. No. 14/132,974, Non Final Office Action mailed Jul. 10, 2015", 8 pgs.
"U.S. Appl. No. 14/135,265, Non Final Office Action mailed Jul. 29, 2015", 11 pgs.
"U.S. Appl. No. 14/141,034, Preliminary Amendment filed Dec. 26, 2014", 7 pgs.
"U.S. Appl. No. 14/141,985, Non Final Office Action mailed Jul. 8, 2015", 20 pgs.
"Control Signaling to Support for Enhanced DL MIMO", R1-104021, 3GPP TSG RAN WG1 Meeting #61bis, (2010), 6 pgs.
"Discussion on scenarios for evaluation of interference cancellation and suppression schemes", R1-130927, 3GPP TSG-RAN WG1 #72bis, (2013), 3 pgs.
"International Application Serial No. PCT/US2014/031845, International Search Report mailed Aug. 26, 2014", 3 pgs.
"International Application Serial No. PCT/US2014/031845, Written Opinion mailed Aug. 26, 2014", 4 pgs.
"International Application Serial No. PCT/US2014/033965, International Search Report mailed Aug. 7, 2014", 3 pgs.
"International Application Serial No. PCT/US2014/033965, Written Opinion mailed Aug. 7, 2014", 5 pgs.
"International Application Serial No. PCT/US2014/034307, International Search Report mailed Aug. 11, 2014", 3 pgs.
"International Application Serial No. PCT/US2014/034307, Written Opinion mailed Aug. 11, 2014", 5 pgs.
"International Application Serial No. PCT/US2014/034337, International Search Report mailed Aug. 8, 2014", 3 pgs.
"International Application Serial No. PCT/US2014/034337, Written Opinion mailed Aug. 8, 2014", 6 pgs.
"International Application Serial No. PCT/US2014/034480, International Search Report mailed Aug. 26, 2014", 3 pgs.
"International Application Serial No. PCT/US2014/034480, Written Opinion mailed Aug. 26, 2014", 4 pgs.
"International Application Serial No. PCT/US2014/034879, International Search Report mailed Aug. 28, 2014", 3 pgs.
"International Application Serial No. PCT/US2014/034879, Written Opinion mailed Aug. 28, 2014", 8 pgs.
"International Application Serial No. PCT/US2014/034966, International Search Report mailed Aug. 22, 2014", 3 pgs.
"International Application Serial No. PCT/US2014/034966, Written Opinion mailed Aug. 22, 2014", 5 pgs.
"International Application Serial No. PCT/US2014/035409, International Search Report mailed Aug. 26, 2014", 4 pgs.
"International Application Serial No. PCT/US2014/035409, Written Opinion mailed Aug. 26, 2014", 6 pgs.
"Taiwanese Application Serial No. 103113875, Amendment filed Oct. 16, 2014", English Translation, 2 pgs.
"Views on the use of DM RS ports / scrambling sequences for MU-MIMO", R1-103830, 3GPP TSG-RAN WG1 Meeting #61bis, (2010), 6 pgs.
Suckchel, Yang, "An Adaptive Discontinuous Reception Mechanism Based on Extended Paging Indicator for Power Saving in UMTS", In: Vehicular Technology Conference, VTC-2006 Fall. IEEE 64th, [Online]. Retrieved from the Internet: <http://i.eexplore.ieee.org/stamp/stamp.jsparnumber=4109444>, (2006), 5 pgs.

* cited by examiner

DEVICE-TO-DEVICE (D2D) PREAMBLE DESIGN

CLAIM OF PRIORITY AND RELATED APPLICATIONS

This patent application claims the benefit of priority, under 35 U.S.C. 119(e), to U.S. Provisional Patent Application Ser. No. 61/806,821, filed Mar. 29, 2013, and to U.S. Provisional Patent Application Ser. No. 61/816,662, filed Apr. 26, 2013, each of which is hereby incorporated by reference herein in its entirety.

BACKGROUND

Proximity-based applications and services represent a fast growing social and technological trend that may have a major impact on the evolution of cellular wireless/mobile broadband technologies. These services can be based on the awareness that two devices or two users are close to each other and, thus, may be able to directly communicate with each other. Existing protocols can require two different steps of discovery and communication in the separate time instances. For example, after the receiver device synchronizes to the transmitter in a first time instance (t1) using the D2D discovery signal, the two devices can then communicate with each other in another time instance t2. In certain situations, if a number of signatures (e.g. different sequences) are used to identify each proximate device or application, the D2D communication may not be possible due to the multiple hypothesis tests to detect and analyze each D2D discovery signal.

OVERVIEW

This application discusses, among other things, methods and apparatus for providing more efficient ways to enable D2D discovery and D2D communication simultaneously. In an example, a method can include assembling device-to-device (D2D) discovery data, or a D2D discovery part, at a wireless device, assembling D2D communication data, or a D2D communication part, at the wireless device, assembling a D2D preamble including the discovery data and the communication data, and transmitting the D2D preamble using a wireless transmitter of the wireless device.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized methods and apparatus for providing more efficient ways to enable D2D discovery and D2D communication simultaneously.

Figure 1:
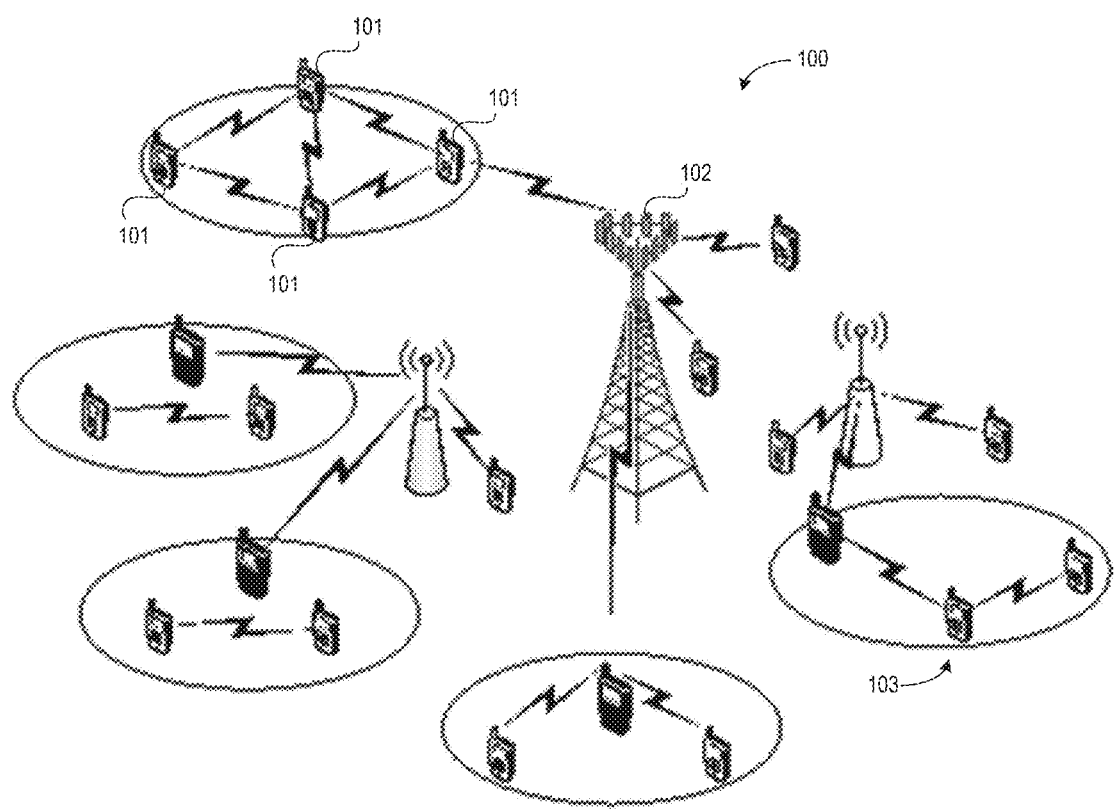
FIG. 1 illustrates generally an example wireless system including D2D users operating and coexisting with traditional cellular users

Proximity-based applications and services represent a fast growing social and technological trend that may have a major impact on the evolution of cellular wireless/mobile broadband technologies. These services are based on awareness that two devices or two users are close to each other and, thus, may be able to directly communicate with each other. Proximity-based applications can include social networking, mobile commerce, advertisement, gaming, etc. These services and applications stimulate the design and development of a new type of device to device (D2D) communication that can be integrated into current and next generation mobile broadband networks such as LTE and LTE-Advanced. By leveraging direct connectivity between two devices in a network, D2D communication can enable machines to communicate directly with one another. Existing mobile broadband networks were designed to optimize performance mainly for human type of communications and thus are not optimized for D2D specific requirements. For example, existing mobile networks do not support the establishment of direct links between two devices. The efficient support and seamless integration of D2D communication in current and future mobile broadband technologies can encourage enhancements or modifications across different layers (e.g., PHY and MAC) in order to optimally address the future D2D demands, meet performance requirements, and overcome technical challenges. In certain examples, D2D users can operate in a co-existing mode and reuse the spectrum with other cellular users. FIG. 1 illustrates generally an example wireless system 100 including D2D users (a typical few labeled 101) operating and coexisting with traditional cellular users. Unlike the existing traditional LTE network infrastructure, D2D users 101 do not necessarily need to communicate via the central coordinator (eNodeB) 102. In certain examples, the D2D users 101 can communicate directly with each other or through hops 103 of other D2D users. When D2D communication shares the same resources with the mobile broadband system, certain functions can still be controlled and coordinated by the eNodeB 102 of the mobile broadband network such as when centralized control offers more benefits.

In certain examples, proximity sensing methods can be implemented by the network through monitoring the UE attachment/association to a particular cell or using location based services and protocols. In addition to these traditional methods, new proximity based functionality can be added to the functions of the D2D coordinator. For example, a special device discovery zone can be allocated in the D2D transmission region where device discovery signaling is used to assist in D2D cluster organization and D2D link establishment. A special discovery signal transmission interval can be introduced in the D2D transmission region for that purpose. Additionally, proximity sensing can be based on D2D link quality measurements.

In certain examples, a more efficient method of providing D2D services can include a D2D preamble having two parts, a D2D discovery part and a D2D communication part. In some examples, the number of signatures can be reduced to relax detection complexity at a receiver device. In some examples, one or more specific codes or signatures can be allocated for special use such as emergency use or public safety use.

In certain examples, the D2D discovery part and the D2D communication part can be multiplexed. In some examples, multiplexing of the D2D discovery part and the D2D communication can be facilitated using time division multiplexing (TDM). In some examples, multiplexing of the D2D discovery part and the D2D communication can be facilitated using frequency division multiplexing (FDM). In some examples, multiplexing of the D2D discovery part and the D2D communication can be facilitated using superposition. In some examples, multiplexing of the D2D discovery part and the D2D communication can be facilitated using a combination of one or more of TDM, FDM, superposition or other multiplexing scheme.

In certain examples, including general multi-carrier system examples, the D2D discovery part can include one or more symbols or a symbol fraction, or combination thereof. In some examples, the discovery part can include OFDM symbols or fraction thereof. In some examples, the discovery part can include SC-OFDM symbols or fraction thereof.

In certain examples, the discovery part can be scrambled. In some examples, the discovery part can be scrambled using codes such as pseudo random codes. In some examples, a scrambling sequence can be derived using a code or signature of the D2D discovery part of a D2D preamble.

In certain examples, data in the D2D communication part can be channel coded by convolution coding, tail-biting convolution coding, block coding, turbo coding, low-density parity coding (LDPC). In certain examples, physical channel or signal in the D2D discovery part can be used for time/frequency synchronization between devices, automatic gain control, channel estimation for D2D communication region, and combinations thereof in certain examples. The D2D communication part can convey a device identification (ID) information or partial device ID information.

In certain examples, D2D preamble transmit timing can be selected by the transmitter or the transmitting device. In some examples, transmit timing selection can be predetermined or can be set using a random manner. In certain examples, where the transmit timing is set using a random manner, the selection can be facilitated by random back-off. In some examples, random back-off can be applied either when a device transmits the initial D2D preamble or when a device faces a collision situation such as when a device does not receive a response signal or channel from another device.

In certain examples, the D2D preamble part can be limited to include a low number of signatures to reduce discovery complexity. For example, if there are multiple signatures in a D2D discovery part, the receiver device can be required to perform multiple hypothesis tests to identify the signatures. This can cause the increase of implementation complexity requiring more processing power. In certain examples, to relax complexity a single signature can be used for the D2D discovery part. In certain examples, a receiving device need only perform a single hypothesis test by cross-correlation for time/frequency synchronization, automatic gain control setting, channel estimation as well as other optimizing functions. In certain scenarios, when multiple D2D discovery signals are transmitted at the same time; it can introduce a composite channel effect and can disrupt or prevent data decoding of the D2D communication part. In certain examples, certain signatures or codes can be use3d to differentiate D2D discovery signals. In some examples, the number of signatures or discovery signals can be limited to 3, which for example, is the same number of as the primary synchronization signal (PSS) in LTE.

For devices in network coverage, assistant information can be provided by the network to assist the discovery and communication operations, in certain examples. In certain examples, if only a single, or a few, signatures are used for D2D discovery signal, a signature can indicate a device is under an emergency or a public safety condition and a receiving device can prioritize the discovery/communication process such that detection of such signatures occurs first.

Figure 2A:
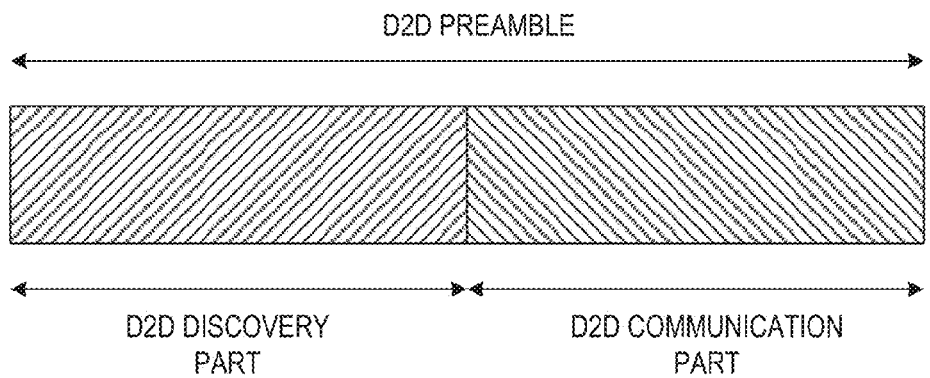
FIGS. 2A and 2B illustrate general high-level example D2D preambles including a D2D discovery part and a D2D communication part.
Figure 2B:
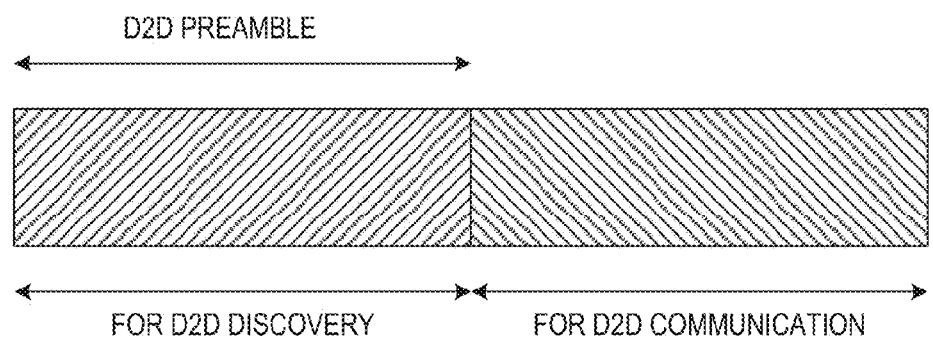

FIGS. 2A and 2B illustrate general high-level example D2D preambles including a D2D discovery Part and a D2D communication part.

Figure 3A:
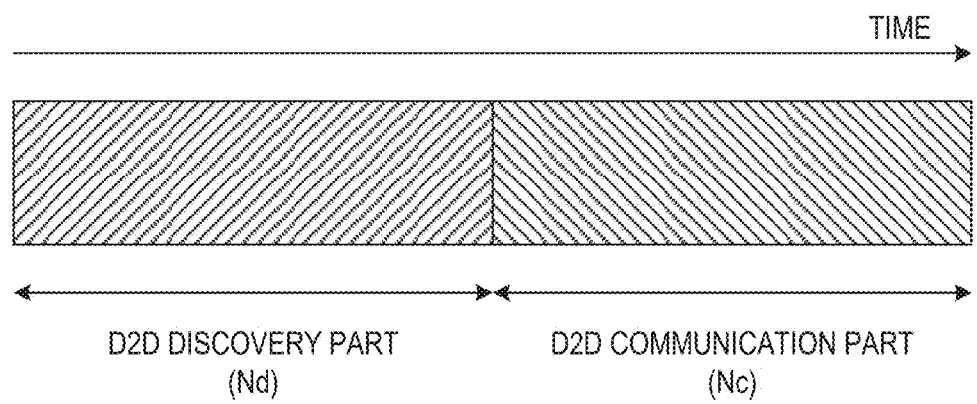
FIG. 3A illustrates generally an example D2D preamble including a D2D discovery part and a D2D communication part multiplexed in a time domain.
Figure 3B:
FIG. 3B illustrates generally an example frequency map of a time division multiplexed (TDM) discovery part including sequences mapped at each subcarrier.

FIG. 3A illustrates generally an example D2D preamble including a D2D discovery part and a D2D communication part multiplexed in a time domain. In certain examples, the D2D discovery part and the D2D communication part can include a number ($N_d$, $N_c$) of OFDM symbols. In certain examples, the ratio of the number of symbols can be determined based on requirements for D2D discovery and communications. In certain examples, transmitted bandwidths for the D2D discovery part and the D2D communication part can be the same so that channel estimates from the D2D discovery part can assist decoding the D2D communication part. FIG. 3B illustrates generally an example frequency map of a time division multiplexed (TDM) discovery part including sequences mapped at each subcarrier. In certain examples, the DC may be punctured or can be vacant to remove DC offset.

Figure 4A:
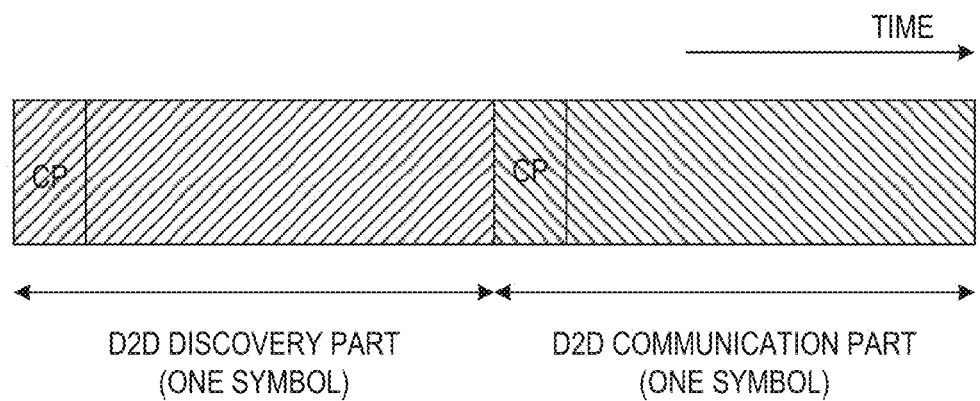
FIGS. 4A and 4B illustrate general high-level example D2D preambles including a D2D discovery part and a D2D communication part
Figure 4B:
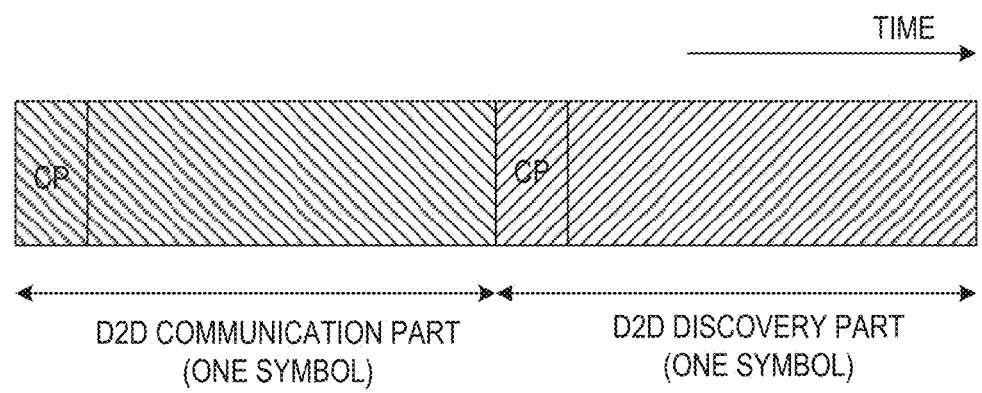

FIGS. 4A and 4B illustrate general high-level example D2D preambles including a D2D discovery Part and a D2D communication part wherein each of the D2D discovery part and the D2D communication part include a cyclical prefix (CP). FIGS. 4A and 4B illustrate generally example D2D preambles where $N_d=N_c=1$. FIGS. 4A and 4B illustrate generally example D2D preambles including a single symbol D2D discovery part and a single symbol D2D communication part. FIG. 4A illustrates and Example D2D preamble having a D2D discovery part time-wise precede a D2D communication part. FIG. 4B illustrates and Example D2D preamble having a D2D communication part time-wise precede a D2D discovery part.

Figure 5:
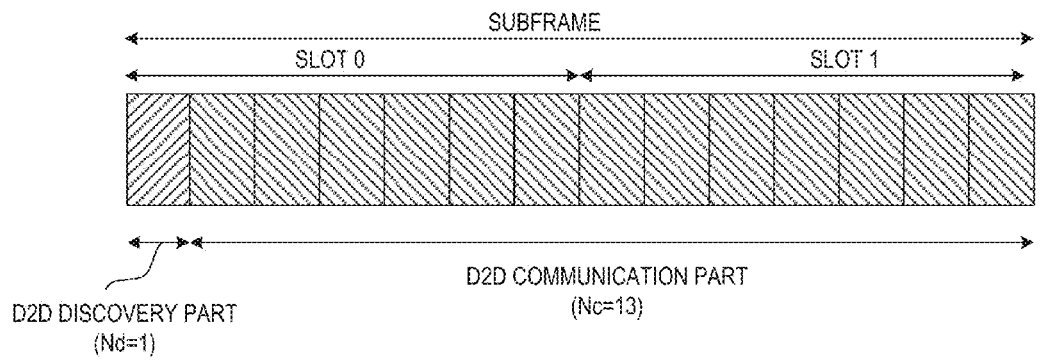
FIGS. 5-7 illustrate generally example TDM D2D preambles each having a D2D discovery part and a D2D communication part.

FIG. 5 illustrates generally an example TDM D2D preamble having a D2D discovery part and a D2D communication part. The D2D preamble is configured to fit to an LTE structure and have $N_d=1$ and $N_c=13$. In certain examples, the D2D discovery part can be located in the first OFDM symbol within a subframe.

Figure 6:
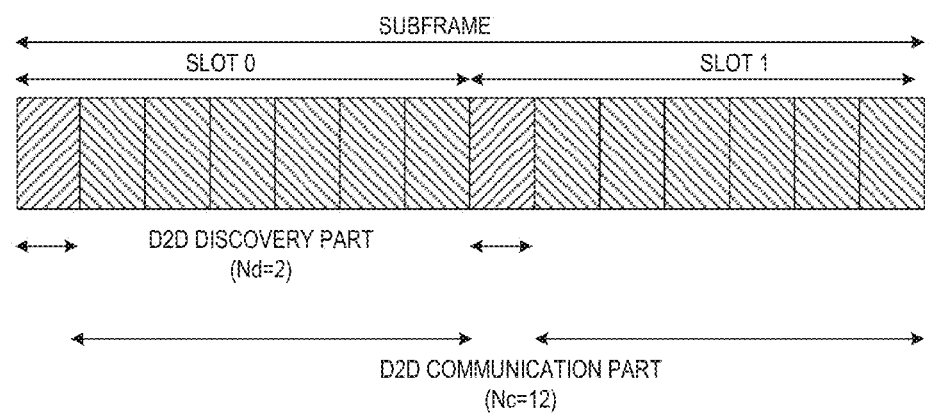

FIG. 6 illustrates generally an example TDM D2D preamble having a D2D discovery part and a D2D communication part. The D2D preamble is configured to fit to an LTE structure and have $N_d=2$ and $N_c=12$. In certain examples, the discovery part signatures can be different and can be used to provide a better auto-correlation property. In some examples, each D2D discovery part can be located in the first OFDM symbol within each slot of a subframe.

Figure 7:
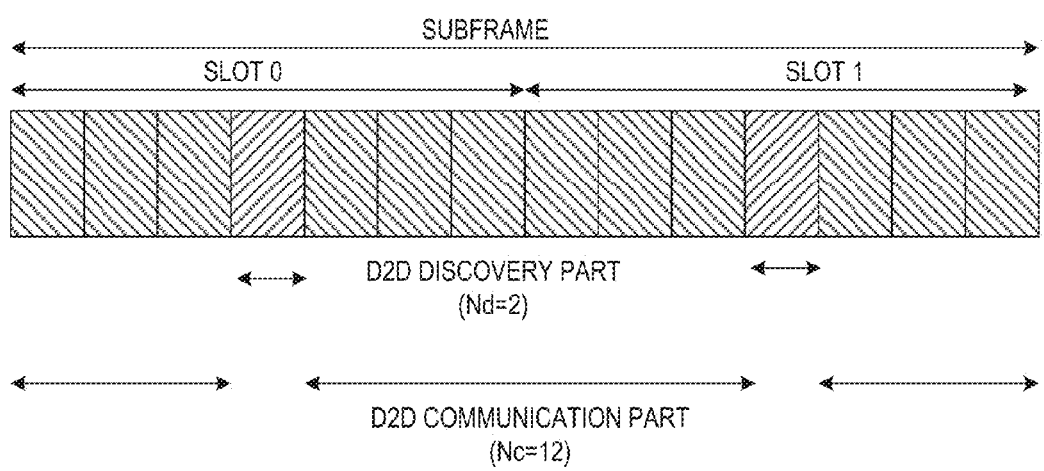

FIG. 7 illustrates generally an example TDM D2D preamble having a D2D discovery part and a D2D communication part. The D2D preamble is configured to fit to an LTE structure and have $N_d=2$ and $N_c=12$. In certain examples, the discovery part signatures can be different and can be used to provide a better auto-correlation property. In some examples, each D2D discovery part can be located in a central OFDM symbol within each slot of a subframe.

Figure 8:
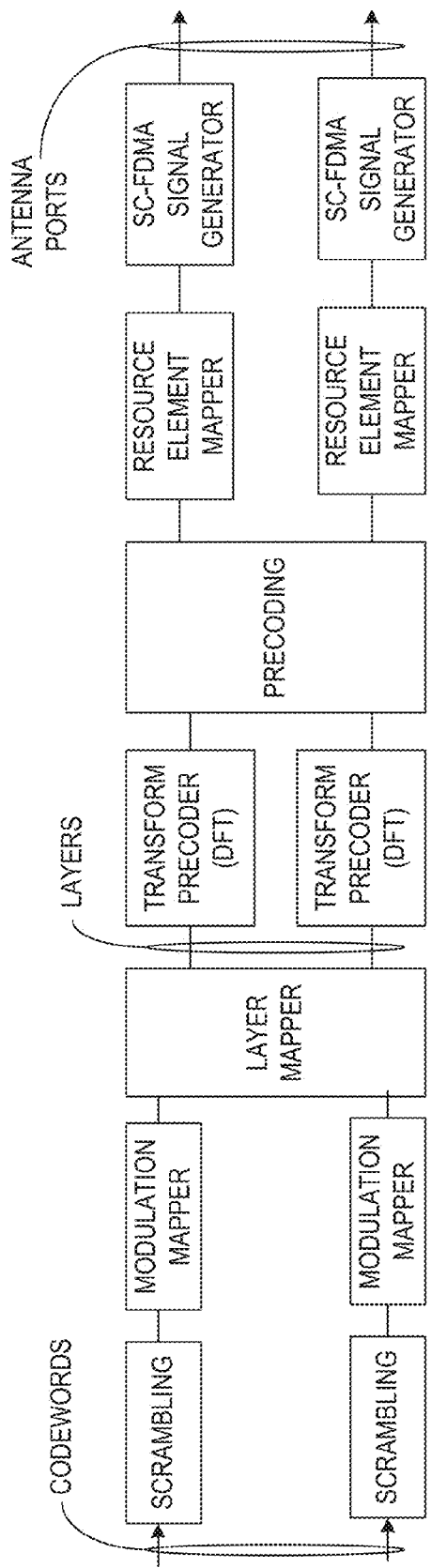
FIG. 8 illustrates generally physical processing for variation of TDM single carrier OFDM waveform referred to as discrete Fourier transform spread OFDM.

FIG. 8 illustrates generally physical processing for variation of TDM single carrier OFDM waveform referred to as discrete Fourier transform spread OFDM. IJN certain examples, the time division multiplexing can be done in the time domain prior to the DFT pre-coding.

Figure 9A:
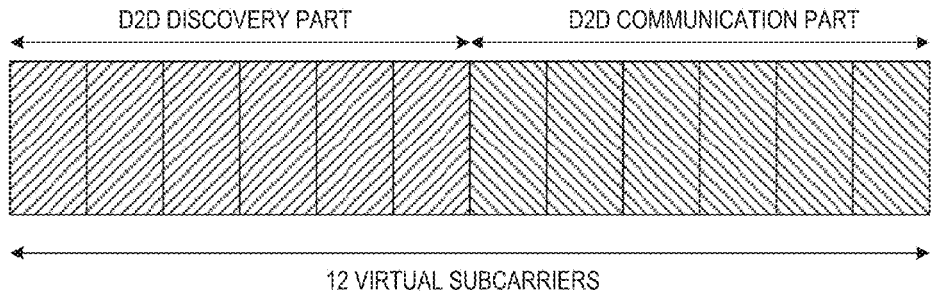
FIGS. 9A-9C illustrates generally an example D2D preamble including a D2D discovery part and a D2D communication part occupying a number of subcarriers
Figure 9B:
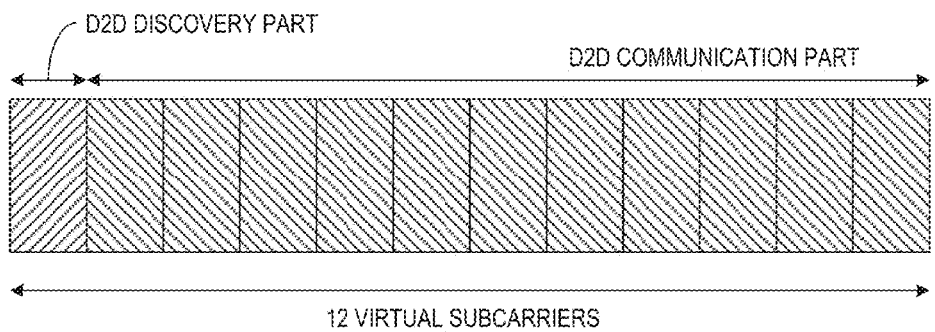
Figure 9C:
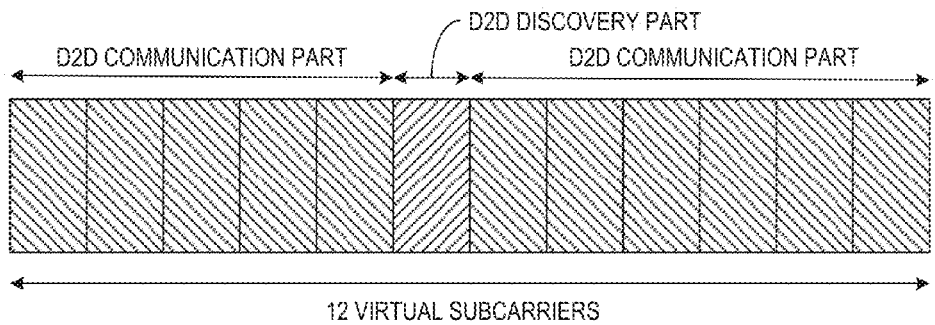

FIGS. 9A-9C illustrates generally an example D2D preamble including a D2D discovery part and a D2D communication part occupying a number of subcarriers, for example, 12 subcarriers, prior to DFT pre-coding.

Figure 10A:
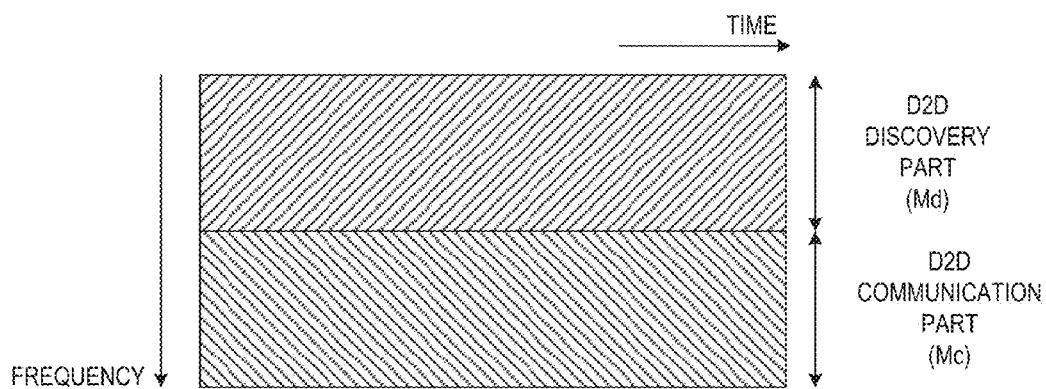
FIG. 10A illustrates generally a high level example of localized FDM multiplexing of the D2D discovery part and the D2D communication part.
Figure 10B:
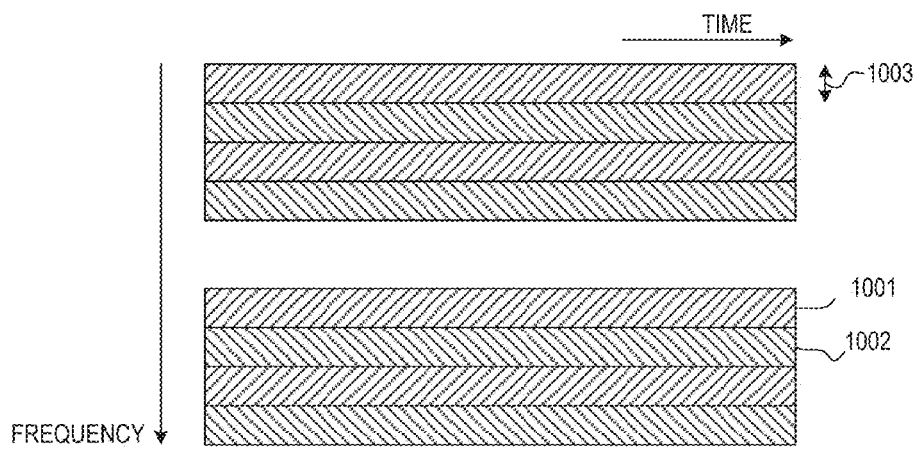
FIG. 10B illustrates generally a high level example of interleaved FDM multiplexing of the D2D discovery part and the D2D communication part.

For frequency division multiplexing the D2D discovery part and the D2D communication part of the D2D preamble can be multiplexed in the frequency domain. FIG. 10A illustrates generally a high level example of localized FDM multiplexing of the D2D discovery part and the D2D communication part. FIG. 10B illustrates generally a high level example of interleaved FDM multiplexing of the D2D discovery part 1001 and the D2D communication part 1002. In certain examples, each interleaved frequency band can represent a resource element such as a subcarrier 1003. As in TDM, there are a number of variances that can be achieved by controlling the location of the D2D discovery part and the D2D communication part in the frequency domain as well as by controlling the ratio ($M_d:M_c$) of symbols or fractions thereof.

Figure 11:
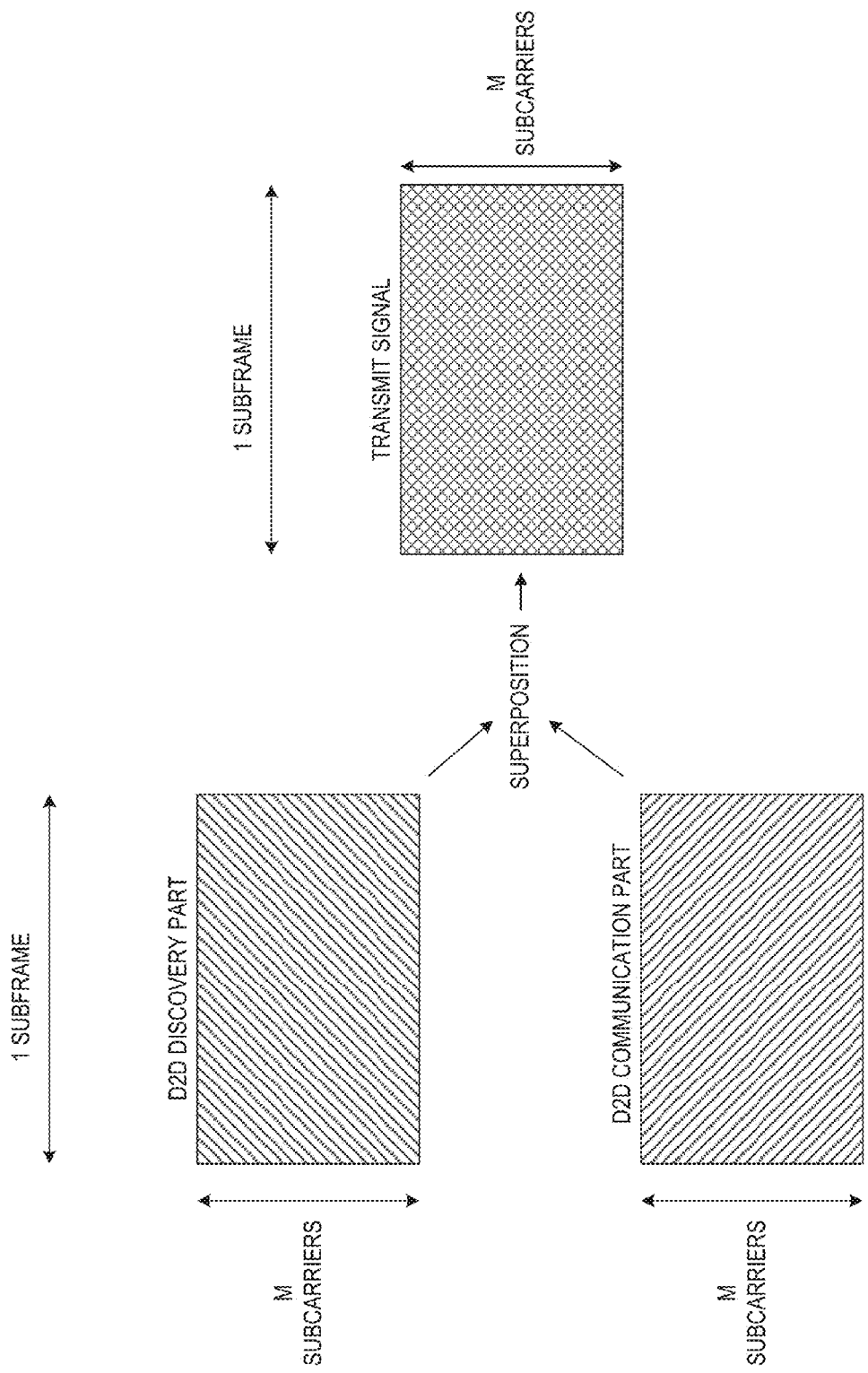
FIG. 11 illustrates generally example superposition of the D2D discovery and communication parts.

FIG. 11 illustrates generally superposition of the D2D discovery and communication parts. In certain examples, the received superposition signal can be represented as, $$R(k)=(\sqrt{\alpha}\cdot D(k)+\sqrt{\beta}\cdot C(k))H(k)+N(k)$$

where
R(k): received signal at subcarrier k,
D(k): D2D discovery signal at subcarrier k,
C(k): D2D communication signal/channel at subcarrier k,
H(k): channel
N(k): noise
α: scaling power for D2D discovery part, and
β: scaling power for D2D communication part.

In an example, $\beta=1-\alpha$ to normalize the transmit power at the transmitting device.

Figure 12:
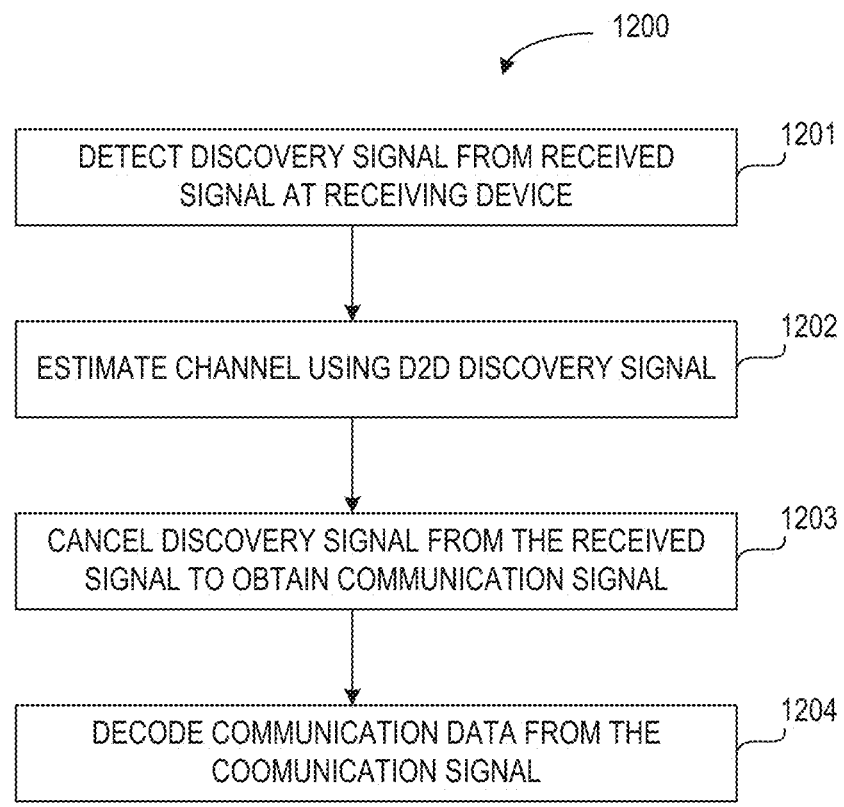
FIG. 12 illustrates generally an example effect of back-off D2D preamble transmissions at a receiving device.

The detection of the D2D discovery signal and the decoding of the D2D communication signal at the receiving device can use the example method 1200 illustrated generally in FIG. 12. At 1201, the receiving device can try to detect the D2D discovery signal (D(k)) by performing cross correlation to obtain synchronization. At 1202, the receiving device can perform channel estimation using D(k) to obtain the channel ($\tilde{H}(k)$) at the synchronized time position. At 1203, the receiving device can cancel the discovery signal (D(k)) from the received signal (R(k)) to isolate the communication signal (C(k)). An estimate of the communication signal can be given by, $$\tilde{C}(k) = R(k) - \frac{1}{\sqrt{\alpha}} \cdot D(k) \cdot \tilde{H}(k).$$

At 1204, the receiving device can try to decode the D2D communication data from the estimated communication signal ($\tilde{C}(k)$). The performance of trying to decode the communication data can depend on the performance of the channel estimate. For example, if the channel estimate is perfectly estimated (e.g., $H(k)=\tilde{H}(k)$), the estimate of the communication signal becomes, $$\tilde{C}(k)=\sqrt{\beta}\cdot C(k)\cdot H(k)+N(k).$$

In certain examples, the data contents of the D2D communication part can be scrambled to provide randomization of the data and interference randomization. In Certain example, scrambling can be performed in symbol level (e.g., modulation symbol level after QPSK or QAM modulation), in information bit level, or in encoded bit level. In certain examples, if scrambling is conducted by pseudo random sequence and is applied after channel coding (e.g., in encoded not level), the result if the scrambling can be represented as $\tilde{b}(i)$, where $$\tilde{b}(i)=(b(i)+c(i))\mod 2,$$

where the encoded bit after channel coding is b(i) and the scrambling sequence is c(i). In certain examples, scrambling can be generated by the 3GPP Gold sequence using the following sequence generation method,

- - - Start of Sequence - - -

Pseudo-random sequences can be defined by a length sequence, such as a length-31 Gold sequence. An output sequence c(n) of length $M_{PN}$, where $n=0, 1, \ldots, M_{PN}-1$, can be defined as, $$c(n)=(x_1(n+N_c)+x_2(n+N_c))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2,$$

where $N_c=1600$ and the first m-sequence can be initiated with $x_1(0)=1$, $x_1(n)=0$, $n=1, 2, \ldots, 30$. The initialization of the second m-sequence can be denoted by $c_{init}=\Sigma_{i=0}^{30}x_2(i)\cdot 2^i$, with the value depending on the application of the sequence.

- - - End of Sequence - - -

In certain examples, the value of $c_{init}$ can be given by,
Physical cell ID of the network attached: $c_{init}=N_{ID}^{cell}$,
UE ID: $c_{init}=n_{RNTI}$,
Predetermined value K (it can be used in a single signature of D2D discovery signal): $c_{init}=K$, where K is an integer value (e.g., K=0 for a single signature of D2D discovery).
Signatures used for D2D discovery signal: $c_{init}=n_D$, where $n_D$ (=0, 1, 2, ... ) is the signature ID used for D2D discovery signal.

In certain examples, entire or partial D2D device Ids can be conveyed via the D2D communication part. In some examples, additional data can be conveyed using the D2D communication part.

As discussed above, transmit timing for a transmitting device, such as a transmitting UE, can be randomized to prevent or mitigate composite channel effects at each receiving device using a single signature of a D2D discovery part. Transmit randomization can improve channel estimation performance, thus, ensuring that the D2D communication part data can be properly decoded.

In certain examples, if transmit timing is selected from a transmitting device, a back-off value can be decided by the uniform distribution within a range. In some examples, the transmitting device can transmit the D2D preamble at the decided back-off time. For LTE structures, a basic unit for the back-off time can include, but is not limited to, an OFDM symbol, a slot, a subframe, a radio frame, etc. In certain examples, the back-off time can be determined based on the D2D device ID.

In certain examples, where the D2D discovery part includes multiple signatures, the multiple signatures can be randomized to avoid the composite channel effect. In some examples, the different signatures can be randomized when the channel estimation is performed. Therefore, at the receiving device, the other channel can be randomized to obtain the correct channel; estimation values for the targeted device. Because receiver complexity increases with each additional signature, in some examples, the number of signatures can be limited. In certain examples, the number of different signatures is limited to three signatures.

Figure 13:
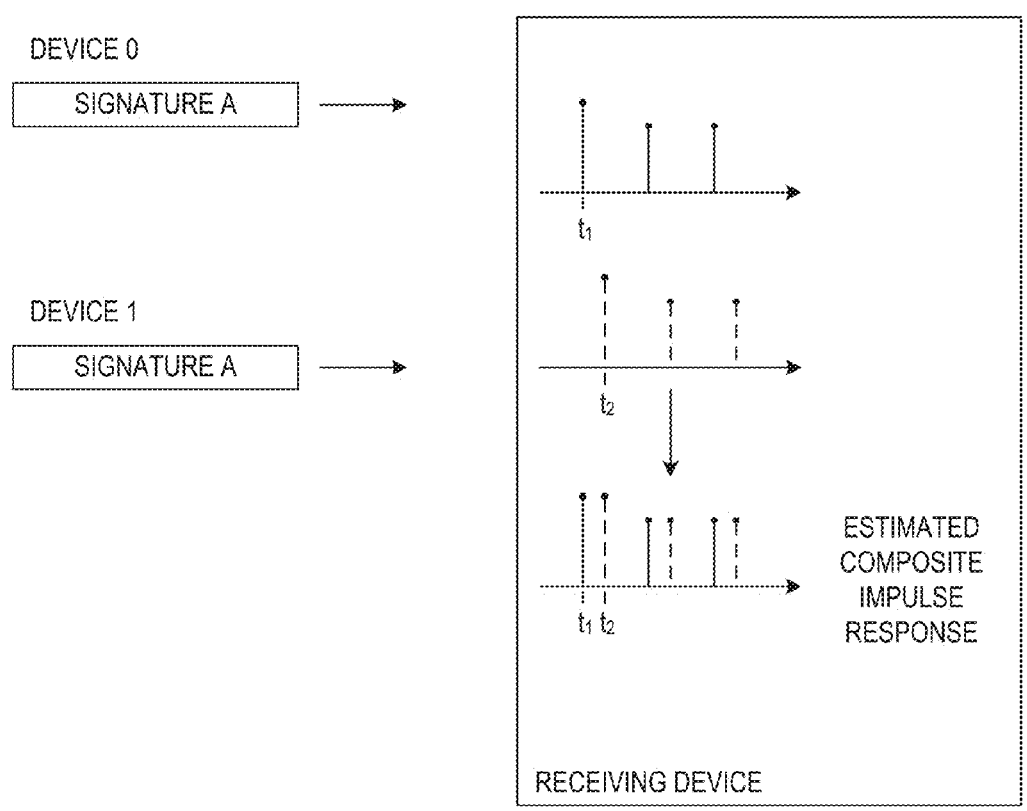
FIG. 13 shows an illustration how the composite channel is generated when the transmit timing is synchronized.

FIG. 13 shows an illustration how the composite channel is generated when the transmit timing is synchronized. To decode the D2D communication part using the channel estimation results from D2D discovery signal, each channel of h0 and h1 needs to be separately estimated. By applying different back-off timing at each transmitter, at the OFDM symbol level at least, the composite channel effect can be reduced.

In alternative examples, the back-off can be applied when a device does not receive a response. For example, if a device transmits a D2D preamble and does not receive a response within a certain interval, the device can apply a random bacjk-off for the next transmission of the D2D preamble.

Figure 14:
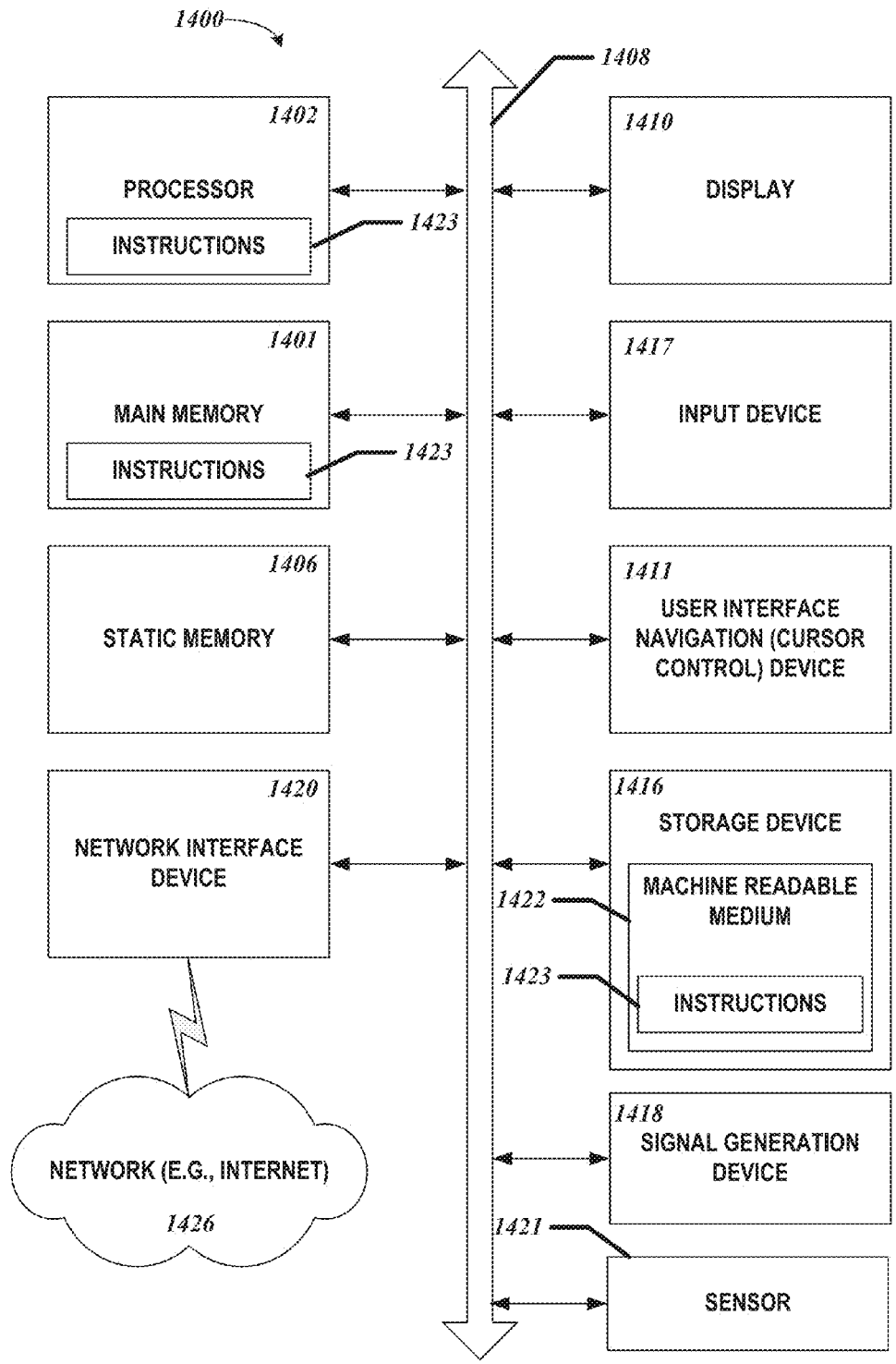
FIG. 14 is a block diagram illustrating an example machine upon which any one or more of the methodologies herein discussed may be executed.

FIG. 14 is a block diagram illustrating an example machine upon which any one or more of the methodologies herein discussed may be executed. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1400 includes a processor 1402 (e.g., a central processing unit (CPU), a graphics processing unit (GPU) or both), a main memory 1401 and a static memory 1406, which communicate with each other via a bus 1408. The computer system 1400 may further include a display unit 1410, an alphanumeric input device 1417 (e.g., a keyboard), and a user interface (UI) navigation device 1411 (e.g., a mouse). In one embodiment, the display, input device and cursor control device are a touch screen display. In certain examples, the computer system 1400 may additionally include a storage device (e.g., drive unit) 1416, a signal generation device 1418 (e.g., a speaker), a network interface device 1420, and one or more sensors 1421, such as a global positioning system sensor, compass, accelerometer, or other sensor.

The storage device 1416 includes a machine-readable medium 1422 on which is stored one or more sets of data structures and instructions 1423 (e.g., software) embodying or utilized by any one or more of the methodologies or functions described herein. The instructions 1423 may also reside, completely or at least partially, within the main memory 1401 and/or within the processor 1402 during execution thereof by the computer system 1400, the main memory 1401 and the processor 1402 also constituting machine-readable media.

While the machine-readable medium 1422 is illustrated in an example embodiment to be a single medium, the term "machine-readable medium" may include a single medium or multiple media (e.g., a centralized or distributed database, and/or associated caches and servers) that store the one or more instructions 1423. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Electrically Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1423 may further be transmitted or received over a communications network 1426 using a transmission medium via the network interface device 1420 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

In certain examples, the central processor 1402 can include one or more processors or processor circuits including a processing circuit configured assemble D2D preambles as discussed herein.

Additional Notes

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method comprising:
   assembling device-to device (D2D) discovery data at a wireless device;
   assembling D2D communication data at thewireless device;
   superimposing the D2D discovery data and the D2D communication data across a plurality of subcarriers of a symbol to provide at least a portion of a D2D preamble; and
   transmitting the D2D preamble using a wirdess transmitter of the wireless device.

2. The method of claim 1, wherein assembling the D2D discovery data includes assembling the D2D discovery data using at least a portion of a first orthogonal frequency-division multiplexing (OFDM) symbol.

3. The method of claim 2, wherein assembling the D2D discovery data includes assembling the D2D discovery data using at least a portion of a second OFDM symbol.

4. The method of claim 1, wherein assembling the D2D preamble include multiplexing the D2D discovery data and the D2D communication data in a time domain.

5. The method of claim 4, wherein a bandwidth of the D2D discovery data is equal to a bandwidth of the D2D communication data.

6. The method of claim 1, wherein transmitting the D2D preamble includes transmitting the D2D discovery data before transmitting the D2D communication data.

7. The method of claim 1, wherein transmitting the D2D preamble include transmitting the D2D communication data before transmitting the D2D discovery data.

8. The method of claim 1, wherein assembling the D2D preamble includes multiplexing the D2D discovery data and the D2D communication data in a frequency domain.

9. The method of claim 1, wherein the symbol includes an orthogonal frequency-division multiplexing (OFDM) symbol.

10. The method of claim 1, wherein the symbol includes a single-carrier frequency-division multiple access (SC-FDMA) symbol.

11. A non-transitory computer-readable storage medium that stores instructions for execution by one or more processors to perform operations for communication by a wireless device, the operations to configure the one or more processors to:
    assemble device-to device (D2D) discovery data at a wireless device;
    assemble D2D communication data at the wireless device;
    superimpose the D2D discovery data and the D2D communication data across a plurality of subcarriers of a symbol to provide at least a portion of a D2D preamble; and
    transmit the D2D preamble using a wireless transmitter of the wireless device.

12. A portable wireless device comprising:
    a processor configured to provide a D2D discovery part of a D2D preamble and a D2D communication part of the D2D preamble, wherein the processor is configured superimpose the D2D discovery part and the D2D communication part across a plurality of suhcarriers of a symbol;
    an antenna; and
    a transmitter configured to transmit the D2D preamble using the antenna, wherein the D2D preamble includes both the D2D discovery part and the D2D communication part.

13. The portable wireless device of claim 12, wherein at least a portion of a first orthogonal frequency -division multiplexing (OFDM) symbol of the D2D preamble includes at least a first portion of the D2D discovery part.

14. The portable wireless device of claim 13, wherein at least a portion of a second orthogonal frequency-division multiplexing (OFDM)symbol of the D2D preamble includes at least a second portion of the D2D discovery part.

15. The portable wireless device of claim 12, wherein the D2D preamble includes the D2D discovery part time-domain multiplexed with the D2D communication part.

16. The portable wireless device of claim 12, wherein the D2D preamble includes the D2D discovery part frequency-domain multiplexed with the D2D communication part.

17. The non-transitory computer-readable storage medium of claim 11, the operations further configure the processor to transmit the D2D preamble using a random back-off delay.

18. The method of claim 1, wherein transmitting the D2Dpreamble includes transmitting the D2D preamble using a random back-off delay.

19. The portable wireless device of claim 12, wherein the transmitter is configured to transmit the D2D preamble using a random back-off delay.

* * * * *